United States Patent
Cybulski et al.

(10) Patent No.: US 10,900,592 B2
(45) Date of Patent: Jan. 26, 2021

(54) SPRAYABLE AND PUMPABLE UREA SILICATE FOAM FOR PIPE PILLOWS, TRENCH BREAKERS AND CIVIL CONSTRUCTION APPLICATIONS

(71) Applicant: MINOVA INTERNATIONAL LIMITED, Bamsley (GB)

(72) Inventors: Frederick Cybulski, Mt. Pleasant, OH (US); Cody Hildreth, Canonsburg, PA (US); Peter Shelley Mills, Stamping Ground, KY (US); Stephen C. Tadolini, Lakewood, CO (US)

(73) Assignee: MINOVA INTERNATIONAL LIMITED, Barnsley (GB)

( * ) Notice: Subject to any disclaimer, the term of this patent is extended or adjusted under 35 U.S.C. 154(b) by 87 days.

(21) Appl. No.: 15/791,597

(22) Filed: Oct. 24, 2017

(65) Prior Publication Data
US 2018/0112801 A1 Apr. 26, 2018

Related U.S. Application Data

(60) Provisional application No. 62/412,718, filed on Oct. 25, 2016.

(51) Int. Cl.
*F16L 1/06* (2006.01)
*F16L 1/028* (2006.01)
(Continued)

(52) U.S. Cl.
CPC ............ *F16L 1/06* (2013.01); *C08G 18/1808* (2013.01); *C08G 18/1816* (2013.01);
(Continued)

(58) Field of Classification Search
CPC .............. F16L 1/026; F16L 1/028; F16L 3/02
(Continued)

(56) References Cited

U.S. PATENT DOCUMENTS

| | | | | |
|---|---|---|---|---|
| 2,773,512 A | * | 12/1956 | Burk ........................ | F16L 59/15 138/113 |
| 3,112,183 A | * | 11/1963 | Goff ........................ | F16L 59/15 174/37 |

(Continued)

FOREIGN PATENT DOCUMENTS

| | | | | | |
|---|---|---|---|---|---|
| GB | | 1392931 A | * | 5/1975 | .............. F16L 1/028 |
| GB | | 1558427 A | * | 1/1980 | .............. F16L 1/028 |

OTHER PUBLICATIONS

Safety Data Sheet MasterRoc MP 367 Foam Part A (Version 2.0). BASF NA Product Regulations, 2015. (Year: 2015).*

(Continued)

*Primary Examiner* — Kenneth Rinehart
*Assistant Examiner* — Richard K. Durden
(74) *Attorney, Agent, or Firm* — William H. Honaker; Dickinson Wright PLLC

(57) ABSTRACT

Disclosed is a method and system for supporting a pipeline in a trench. The disclosure is directed to the placement of urea-silicate sprayable or pumpable foams into trenches to provide pipeline pillow supports during placement of the pipeline and to form trench breakers in the trench prior to the trench being backfilled. The pillow supports and trench breakers inhibit erosion of the trench prior to and after being backfilled. The urea-silicate foam material has an open cell content of at least 50% to resist floatation, is non-flammable and electrically conductive. Also disclosed is use of supports for placement between the urea-silicate foam and the bottom of the trench to aid in utilization of the urea-silicate foams in cold weather conditions and in trenches with steeply sloped bottoms. Preferably the supports are biodegradable and electrically conductive when wet.

12 Claims, 7 Drawing Sheets

(51) Int. Cl.
*F16L 3/02* (2006.01)
*C08G 101/00* (2006.01)
*C08J 9/00* (2006.01)
*C08G 18/38* (2006.01)
*C08G 18/18* (2006.01)
*C08G 18/76* (2006.01)
*F16L 3/12* (2006.01)
*F16L 1/026* (2006.01)

(52) U.S. Cl.
CPC ..... *C08G 18/1825* (2013.01); *C08G 18/3895* (2013.01); *C08G 18/7664* (2013.01); *C08J 9/0061* (2013.01); *F16L 1/028* (2013.01); *F16L 3/02* (2013.01); *F16L 3/12* (2013.01); *C08G 2101/005* (2013.01); *C08G 2101/0058* (2013.01); *C08G 2101/0083* (2013.01); *C08J 2201/022* (2013.01); *C08J 2205/05* (2013.01); *C08J 2207/00* (2013.01); *C08J 2207/04* (2013.01); *C08J 2375/00* (2013.01); *C08J 2483/12* (2013.01); *F16L 1/026* (2013.01)

(58) Field of Classification Search
USPC ................. 138/105; 405/157, 184.4
See application file for complete search history.

(56) References Cited

U.S. PATENT DOCUMENTS

| | | | | |
|---|---|---|---|---|
| 3,313,321 | A * | 4/1967 | Keller | F16L 59/15 138/105 |
| 3,380,258 | A * | 4/1968 | Young | F16L 59/15 138/149 |
| 3,582,533 | A * | 6/1971 | Albright | H02G 9/025 138/105 |
| 3,655,564 | A * | 4/1972 | Barrington | F16L 59/15 138/105 |
| 4,063,429 | A * | 12/1977 | Wilson | F16L 1/028 138/105 |
| 4,068,448 | A * | 1/1978 | Modeen | B65B 9/045 53/131.3 |
| 4,069,684 | A * | 1/1978 | Wilson | F16L 1/028 264/32 |
| 4,629,364 | A * | 12/1986 | Sayles | F16L 1/026 138/32 |
| 4,920,155 | A | 4/1990 | Bode | |
| 6,413,018 | B1 * | 7/2002 | Klaymar | F16L 1/028 405/157 |
| 6,764,250 | B2 * | 7/2004 | Kim | E01F 5/005 405/124 |
| 8,568,061 | B2 | 10/2013 | Kalinowski et al. | |
| 2003/0082009 | A1 * | 5/2003 | Humphries | E04G 15/068 405/118 |
| 2003/0139525 | A1 * | 7/2003 | Bode | C04B 28/003 524/589 |
| 2004/0003571 | A1 * | 1/2004 | Moroschan | E01C 3/003 52/741.11 |
| 2004/0190997 | A1 * | 9/2004 | Farrier | E03F 3/04 405/184.4 |
| 2007/0180764 | A1 * | 8/2007 | Forman | E01C 11/221 47/33 |
| 2010/0108825 | A1 * | 5/2010 | Brock | F16L 1/06 248/73 |
| 2012/0028064 | A1 * | 2/2012 | Perello | C04B 24/2641 428/511 |
| 2014/0348591 | A1 * | 11/2014 | Hamman | F16L 1/028 405/184.3 |
| 2016/0221715 | A1 * | 8/2016 | Pratt | F16L 1/0246 |
| 2016/0319961 | A1 * | 11/2016 | Pratt | B23K 37/0426 |
| 2018/0010311 | A1 * | 1/2018 | Harris | E02B 9/06 |

OTHER PUBLICATIONS

Safety Data Sheet MasterRoc MP 367 Foam Part B (Version 4.0). BASF NA Product Regulations, 2015. (Year: 2015).*
MasterRoc MP 367 Foam [Technical Data Sheet]. BASF Corporation, 2015. <www.buildsite.com/pdf/master_builders_solutions/MasterRoc-MP-367-Formerly-MEYCO-MP-367-Foam-Product-Data-1524113.pdf>. Accessed Jun. 13, 2019. (Year: 2015).*

* cited by examiner

SPRAYABLE AND PUMPABLE UREA SILICATE FOAM FOR PIPE PILLOWS, TRENCH BREAKERS AND CIVIL CONSTRUCTION APPLICATIONS

RELATED APPLICATIONS

The present application claims the benefit of U.S. Provisional Application No. 62/412,718, filed on Oct. 25, 2016.

STATEMENT REGARDING FEDERALLY SPONSORED RESEARCH

None.

TECHNICAL FIELD

This disclosure relates generally to methods of preparing foam pillows and foam trench beakers for pipelines and more particularly to use of urea silicate foams for preparing the foam structures.

BACKGROUND OF THE DISCLOSURE

This section provides background information which is not necessarily prior art to the inventive concepts associated with the present disclosure.

In modern pipeline formation a pipeline trench is constructed to bury the pipeline. These pipelines can be used to carry a variety of gases and liquids including, without limitation, natural gas, oil, water, sewage, drainage run off and other materials. For carrying liquids and gases the pipelines typically use applied pressure or gravity to move the gas or liquid through the pipeline. The pipelines can also be used to enclose electrical lines, communication lines, cable lines and other lines. Typically as the trench is dug and prior to placement of the pipeline in the trench a series of support pads or so called pillows are placed in the bottom of the trench to serve as supports for the pipeline, to prevent the pipeline coatings from damage and to protect the pipeline welds from damage in the trench. Likewise, as the pipeline is laid in the trench on top of the pads or pillows a series of trench breakers are installed in the trench. These trench breakers, also known as water breakers, typically are wall-like formations that surround the pipeline(s) and extend from the bottom of the trench to the top and span the width of the trench thereby transecting the trench. They provide further support to the pipeline and trench; they prevent erosion and help to divert water in the trench prior to it being backfilled. The trench breakers continue this function of diversion and erosion prevention even after the trench is backfilled. Thus, the trench breaker needs to be capable of allowing water to pass through it while also directing the water as desired. For these reasons, the pillows and trench breakers are important elements in pipeline formation.

In the past the pillows and trench breakers were formed using sandbags to make the structures. This process has several drawbacks including that the process requires forming the sandbags which is a slow process, the bags can be heavy and the process requires workers to actually enter the trench to place the bags. This can be dangerous for workers as the trenches are not always stable and can be quite deep. The sandbags also are abrasive and can affect the coatings typically applied to the outside of the pipeline. These coatings can include anti-corrosion coatings and sealing coatings, therefore they need to remain intact for the most efficient pipeline formation.

A recent change in pipeline formation has been to replace the sandbags with use of polyurethane foams to form the pillows and the trench breakers. These are typically sprayed in place which allows the workers to avoid having to go into the trench to place the pillows or form the trench breakers; however the use of polyurethane foam is associated with a variety of disadvantages. The first disadvantage is the polyurethane foam requires a worker to use specialized protective equipment because the polyurethanes are potentially hazardous to humans. In addition the reaction leading to the formation of the polyurethane foam is highly exothermic and the generated heat can be significant, fires have been started when applying the polyurethane foam material. The foam itself is potentially flammable and the fumes produced can be toxic. The polyurethane foam is not very conductive and this can interfere with the cathodic protection systems used on pipelines. The foam can be quite non-porous, comprised of predominantly closed cells, and this can lead to excessive floatation of the pipeline in the presence of water in the trench. This floatation issue can be significant because it can lead to disruption of the pipeline and breakages and other issues with the pipeline both as it is being built and after the trench has been backfilled.

It is desirable to provide a solution to these issues with use of polyurethane foams in pipeline formation. Preferably the solution will be cost effective, allow workers to remain outside a trench when utilizing the solution, and not require large scale changes to existing trench forming and pipeline laying procedures.

SUMMARY OF THE DISCLOSURE

This section provides a general summary of the disclosure and is not a comprehensive disclosure of its full scope or all features, aspects or objectives.

In one embodiment, this disclosure provides a method for supporting a pipe in a trench comprising the steps of: a) providing, separately, a component A and a component B, wherein component A comprises at least 23% by weight of alkali silicate and a catalyst and component B comprises at least 75% by weight of at least one polyisocyanate and a block copolymer according to general formula I herein, based on the total weight of component A and component B, respectively; b) combining component A with component B thereby forming a urea-silicate foam material; c) depositing the urea-silicate foam material into the trench and allowing it to foam and cure thereby forming a urea-silicate foam pillow; and d) placing a pipe into the trench with a portion of the pipe in contact with the foam pillow.

In another embodiment, the disclosure is a method for supporting a pipe in a trench comprising the steps of: a) providing, separately, a component A and a component B, wherein component A comprises at least 23% by weight of alkali silicate and a catalyst and component B comprises at least 75% by weight of at least one polyisocyanate and a block copolymer according to general formula I herein, based on the total weight of component A and component B, respectively; b) combining component A with component B thereby forming a urea-silicate foam material; c) placing a pipe into the trench; and d) depositing the urea-silicate foam material into the trench over a portion of the pipe and allowing it to foam and cure around a portion of the pipe thereby forming a urea-silicate foam trench breaker in the trench.

In another embodiment the disclosure provides a pipe in a trench comprising: a support in the trench, the support in contact with the pipe, the support formed from a urea-silicate foam material having an open cell content of at least 50% and being electrically conductive.

These and other features and advantages of this disclosure will become more apparent to those skilled in the art from the detailed description of a preferred embodiment. The drawings that accompany the detailed description are described below.

DETAILED DESCRIPTION OF A PREFERRED EMBODIMENT

Figure 1:
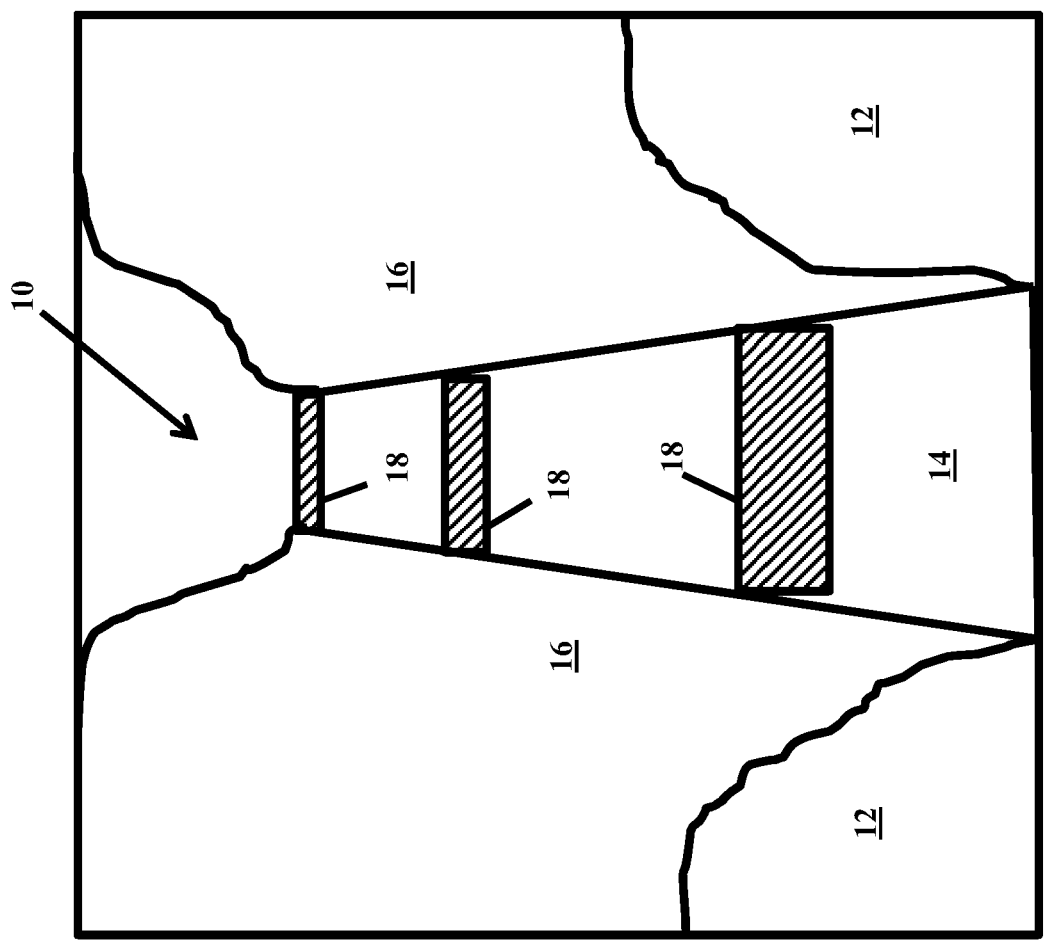
FIG. 1 is a schematic of a pipeline trench having installed therein a plurality of foam pillows in accordance with the present disclosure for supporting a pipeline.

The following terms as used in the present specification and claims have the meanings as defined herein. The term "urea silicate foam" refers to the foam formed as a result of the reaction between a component A and a component B of the foam forming mixture. Component A refers to the foam forming mixture component whose primary composition is sodium silicate. Component B refers to the foam forming mixture component whose primary composition is a polyisocyanate. Urea-silicate foams are sometimes referred to as polyurea silicate foams, silicate resin foams or organomineral foams. All of these terms are intended to be included by the designation urea-silicate foam. The term "sodium silicate" has also been referred to as "water-glass" and is intended to mean the same thing. In addition, as known to those of skill in the art sodium silicate can be substituted for by potassium silicate, lithium silicate and ammonium silicate in the present disclosure. These are known as alkali silicates and are typically in liquid form. They provide in the foam reaction described herein $Me_2O$, wherein in the "Me" stands for an alkali metal atom.

The present disclosure is directed to a urea-silicate foam material that is used to support pipelines in trenches and also to form trench breakers in pipeline trenches. The foam material is a urea-silicate foam product formed when component A and component B are mixed together within a static mixer prior to entering a placement wand; the mixer ensures final product homogeneity and proper chemical reaction. The mixed material expands quickly and can carry vertical and shear loads throughout the pipe or structure placement. The placement wand is used to direct the pumped mixed material to the desired location in the trench. In other embodiments the mixed material can be sprayed rather than being pumped to a desired location. When sprayed the mixed material is either pushed out of a spray nozzle or mixed with compressed air to permit it to be sprayed to a desired location. One application for the foam material is the use as pads or pillows for pipeline installation. These pads/pillows are formed in the bottom of the trench prior to placing the pipeline in the trench on top of the formed pads/pillows. The pads/pillows can span the entire width of the trench; however they do not need to span the entire width of the bottom of the trench, instead they just need to be wide enough to support the pipeline. The pipelines can be used to carry a variety of gases and liquids including, without limitation, natural gas, oil, water, sewage, drainage run off and other materials. For carrying liquids and gases the pipelines typically use applied pressure or gravity to move the gas or liquid through the pipeline. The pipelines can also be used to enclose electrical lines, communication lines, cable lines and other lines.

The two-component urea-silicate foam product material can also be used for trench breakers or water breakers, which, minimize the erosion caused by surface or ground water prior to backfilling a pipeline trench or other trench. Additionally, the urea-silicate foam also minimizes piping and trench erosion after backfilling takes place. In part the erosion prevention of these structures according to the present disclosure even after backfilling of the trench is due to the porous nature of the urea-silicate foam material. This property permits water to pass through the pillow or trench breaker and prevents soil slippage, even when the soil is moist and on a steep grade. The foam material according to the present disclosure can also be applied to minimize ground water or surface flows in construction/civil projects. Another example of its use is in safeguarding wetland sites near trenches and to divert the flow of water.

The urea-silicate foams according to the present disclosure are prepared in accordance with the disclosure in U.S. Pat. Nos. 4,920,155 and 4,920,155 is hereby incorporated in its entirety by reference. The urea-silicate foam according to the present disclosures include at least 4 ingredients divided into an A component and a B component as described herein.

The first component, component A, comprises at least an alkali silicate and a catalyst. It can also include water, foam stabilizer(s) and other additives such as finely divided nucleating substances, emulsifier(s), flame retardants, aggregates, fillers and dyes. The alkali silicates used preferably have a high solids content of 28 to 60, more preferably 40 to 60% by weight of inorganic solids. The preferred alkali silicate is a sodium silicate and the molar ratio of $SiO_2$ to $Na_2O$ is advantageously in the range from 2.0 to 4.0, especially from 2.0 to 3.2. If potassium silicates are used the molar ratio of $SiO_2$ to $K_2O$ is in the range from 2.8 to 4.1, preferably from 2.8 to 3.4. The solids content of the potassium silicate is in the range from 28 to 45, preferably from 35 to 45 percent by weight. The amount of alkali silicate used can vary widely depending on the other components of the foam. Preferably the molar ratio of NCO groups to $Me_2O$ groups is >2, more preferably from 2.5 to 5. The amount of alkali silicate in component A can range from about 23 to 95% by weight based on the total weight of component A; preferably it comprises at least 70% and more preferably at least 85%. The catalysts utilized are known to those of skill in the art and include: tertiary amines such as triethylamine, tributylamine, N-methylmorpholine, N-ethylmorpholine, N-cocomorpholine, N,N,N'N'-tetramethylethylene diamine, 1,4-diazabicyclo(2,2,2)octane, N-methyl-N'-dimethylaminoethylpiperazine, N,N-dimethylbenzylamine, bis-(N,N-diethylaminoethyl)adipate, N,N-diethylbenzylamine, pentamethyldiethylene triamine, N,N-dimethylcyclohexylamine, N,N,N',N'-tetramethyl-1,3-butane diamine, N,N-dimethyl-.beta.-phenylethylamine, 1,2-dimethylimidazole, 2-methylimidazole and hexahydrotriazine derivatives; silaamines with carbon-silicon bonds such as 2,2,4-trimethyl-2-silamorpholine and 1,3-diethylaminomethyl-tetramethyl di siloxane; bases containing nitrogen, such as tetraalkylammonium hydroxides, alkali metal hydroxides such as sodium hydroxide, alkali metal phenolates such a sodium phenolate or alkali metal alcoholates such as sodium methylate; organo-metallic compounds, especially organic tin compounds, preferably tin(II) salts of carbonic acids, such as tin(II) acetate, tin(II) octoate, tin(II) ethylhexoate and tin(II) laurate, and the dialkyl stannic salts of carbonic acids, such as dibutyl tin diacetate, dibutyl tin dilaurate, dibutyl tin maleate or dioctyl tin diacetate; catalysts that catalyze the addition reactions and/or the polymerisation or trimerisation of isocyanates, such as 2,4,6-tris(dimethylaminomethyl) phenol. Catalysts preferably used in the process according to the disclosure are 2,4,6-tris(dimethylaminomethyl)phenol, dimethylcyclohexylamine and tetramethylhexamethylene diamine. The catalyst is usually employed in the process of the disclosure in an amount of about 0.001 to 10, preferably 0.3 to 4.0 percent by weight, based on the amount of isocyanate. The amount of catalyst used can be adjusted up or down depending on expected environmental temperatures, when used in colder environments such as an ambient temperature of 15° C. or less the amount of catalyst can be increased to improve the speed of foam formation as desired.

Water is an optional ingredient in component A, but when present it is preferably present in an amount of from 1 to 32% by weight based on the total weigh of component A. Component A can further comprise foam stabilizers, especially polymeric phosphates such as potassium tripolyphosphate or sodium polyphosphates, these can be present in amounts of from 20 to 150 parts by weight based on 100 parts of NCO groups, more preferably from 60 to 120 parts.

The second component, component B, is predominantly composed of a polyisocyanate and a hydrophobic polysiloxane and polyether block copolymer having the general formula I

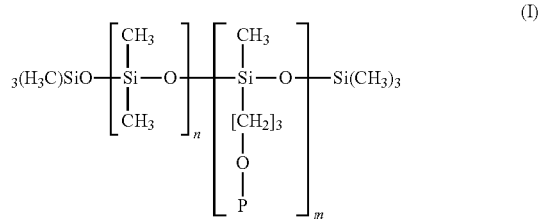

where P means a group of the formula

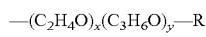

in which R represents a hydrogen atom or an alkyl group and n, m, x and y are integers giving the respective degree of polymerisation, the polysiloxane block being linked to the polyether block by a non-hydrolysable SiC bond and the proportion of ethylene oxide units in the polyether block being 30 to 80%, preferably 50 to 75%. The terminal group of the polyether block is a hydrogen atom or an alkoxy group, with the alkoxy preferred. The polysiloxane and polyether block copolymer employed is a "hydrophobic" polymer, the measure of its hydrophobic nature being the cloud point of a 4 percent aqueous solution. The block copolymers suitable under the disclosure exhibit a cloud point of not more than 60° C. The cloud point depends on the ethylene oxide content of the polyether block.

It is preferred to use as the polyisocyanate polymeric methylene diphenyl diisocyanate (polymeric MDI). Any other polyisocyanates can be used as are known in the art including polyisocyanate prepolymers or blends of polyisocyanate prepolymers. These include for example 2,3 and 2,6 toluylene diisocyanate, and any desired mixtures of these isomers ("TDI"), polyphenyl polymethylene polyisocyanates of the type manufactured by aniline/formaldehyde condensation and subsequent reaction of the condensation product with phosgene (carbonyl chloride) ("crude MDI"), and polyisocyanates containing carbodiimide groups, urethane groups, allophanate groups, isocyanurate groups, urea groups or biuret groups ("modified polyisocyanates"). All of these forms of polyisocyanate are intended to be referred to by the term polyisocyanate in the present specification and claims. Polymeric MDI is preferred because it is very effective in producing useful urea-silicate foams in a cost-effective manner. Preferably the amount of polyisocyanate is at least 75% by weight, more preferably 87% by weight or more based on the total weight of component B. Component B further includes the hydrophobic polysiloxane and polyether block copolymer having the general formula I. Preferably the block copolymer is present in an amount of from 3 to 50, more preferably from 7 to 45 parts by weight based on 100 parts by weight of NCO groups. Component B can further comprise known foam additives such as: flame retardants at up to 15% by weight; foam stabilizers at 1 to 15% by weight; and viscosity reducers, emulsifiers, additional catalysts and finely divided solids as nucleating agents totaling from 0.1 to 15% by weight all based on the total weight of component B. The nucleating agents can include finely divided silicon dioxide or aluminum oxide. The flame retardants are those known in the art and include those based on bromine, chlorine and phosphorous. There is no blowing agent required for the present urea-silicate foam, it relies on the reaction of the polyisocyanate with water in component A to generate carbon dioxide which serves as the blowing agent for the foam.

The components A and B are stored in separate tanks and a standard foam mixing and pumping system can be utilized to mix and apply the foam to a desired location. These pumping application systems are compact, highly mobile and can be operated with a minimal number of workers. Preferably the components A and B are heated to and maintained at temperatures of from 21 to 33° C. in their storage tanks. The components A and B are preferably combined in a ratio of from 1:1±10% on a volume basis utilizing a static in-line mixer in the pumping system. The combined components are then pumped or sprayed from a wand to the desired location. The wand and pumping system allows a worker to stay outside the trench and apply the foam to a desired location. The worker can form pillows or trench breakers as desired utilizing this system.

The chemistry of the urea-silicate foam according to the present disclosure overcomes many of the issues with polyurethane foams. The exothermic reaction of components A and B according to the present disclosure has maximal temperatures of approximately 105° C. or less, which is much lower than the typical exothermic reaction temperature of 150° C. or more for many polyurethane foams. As discussed above use of polyurethane foams has been associated with fire hazards and has initiated fires in trenches. The urea-silicate foams according to the present invention are non-flammable. Exposure of the foam according to the present disclosure to an open flame from a blow torch did not result in the foam supporting a fire instead the flame was self-extinguished in the foam. This is a big benefit compared to the polyurethane foams which are highly flammable. The foaming reaction happens very quickly for the disclosed urea-silicate foam and the produced foams do not require any use of forms to hold the foam in place as it cures. The produced foams are cool to the touch and firm within 2 minutes or less and fully cured in 20 minutes or less. The expansion ratio of the foams according to the present invention is from about 15:1 to 30:1. The components A and B have a density of approximately 1201 $Kg/m^3$, and the foamed product has a density of from 16 to 80.09 $Kg/m^3$. Foams prepared according to the present disclosure have a compressive strength according to DIN 4093 of at least 1.37 to 10.34 $N/cm^2$. This strength is more than sufficient to support any desired pipeline.

The foams according to the present disclosure have an open cell content of at least 50% and preferably at least 90%, thus they are very porous. This enables the foam to divert water and prevent erosion while still allowing water to pass through the foam in a percolation fashion. Thus, when used as trench breakers or pillows the present foams do not cause excessive flotation of the pipelines and instead they slow the water to prevent erosion while still allowing it to pass through the pillow or trench breaker. They also prevent shifting of wet soil even on steep grades. The foams, although being porous, are very strong structurally and are not frangible. In a test of the water permeability a PVC tube having a diameter of 150 mm was filled with the foam according to the present disclosure to a depth of 310 mm and allowed to cure. Then a water source with a pressure gauge was placed on top of the cured foam and sealed in place. Water was applied to the foam at a series of pre-pressures for 5 minutes and the amount of water passing through the foam column over 5 minutes was measured. The results are shown below in Table 1. The results demonstrate that the foam according to the present disclosure is permeable to water and that the foam is somewhat compressed as the pressure of the water flow increases.

TABLE 1

| Test | Pre-pressure (bar) | Post-test pressure (bar) | Kg of water in 5 minutes | Permeability L/minute through the foam column |
|---|---|---|---|---|
| 1 | 0.5 | 0.75 | 2.120 | 154.8 |
| 2 | 1.0 | 1.1 | 1.977 | 72.2 |
| 3 | 2.0 | 2.0 | 1.814 | 33.1 |
| 4 | 0.5 | 0.6 | 1.714 | 125.2 |

The foam according to the present invention has sufficient electrical conductivity that it does not interfere with the cathodic protection elements typically used in pipelines. This was demonstrated in the following series of tests. In a first set up a 17 pound anode was placed 30 cm underground and covered with moist clay. A #12 red wire was run from the anode to a test station set above ground and a #12 white wire was CAD welded to the pipe and run above ground to the test station. A fusion bonded epoxy (FBE) coated six inch pipe was placed on two pillows formed from the urea-silicate foam according to the present invention that were set up on top of the ground. Resistance readings taken in the foam itself at a plurality of 2.5 cm spacings between the leads measured from 135 to 150 kilo Ohms. In a first test a voltmeter with a copper-copper sulfate reference electrode was connected to the pipe. Holidays were present in the pipe coating and in contact with the foam. The initial pipe to soil reading without the anode wire connected to the pipe wire was −270 millivolts. After the anode wire was connected to the #12 white wire by an bonding strap the pipe to soil reading was −1708 millivolts. In a second test the pipe remained in direct contact with the foam through the holidays and the anode wire was disconnected from the pipe wire in the test station. The pipe to soil reading right after the anode was disconnected was −1060 millivolts, indicating the pipe had polarized because of current transfer through the blocks. In a third test the pipe was lifted off the blocks and placed on rounded pieces of fiber reinforced plastic (FRP) on top of the foam blocks, thereby isolating the pipe from the foam. The voltmeter was then connected again and the anode was disconnected. The pipe to soil reading returned back to −270 millivolts. The polarization of the pipe in test two confirms that current is transferred from the anode through the soil and the foam blocks to the holiday on the pipe. Thus, the urea-silicate foam according to the present disclosure is conductive and will not shield the cathodic protection coatings on a pipeline. This is unlike many polyurethane foams currently used which are not conductive and thus interfere with the cathodic protection applied to pipelines.

As discussed herein the urea-silicate foam material according to the present disclosure can be placed in a trench using an application wand, thereby allowing the installer to remain outside of the trench or excavation. The dimensions of the applied foam can be controlled by applying different thicknesses or geometrical configurations for the specific applications and engineering requirements. In general the pads or foam pillows have a thickness sufficient to raise the pipeline off the bottom of the trench by at least 15 cm or more. Water barriers or breakers can be developed to the required dimensions by utilizing a single layer or several layers of material without the undesired result of excessive heat or ignition. The foam material is "cool to touch" shortly after the expansion has been completed. The foamed material according to the present disclosure is very durable and can remain uncovered and exposed in the trench for extended periods of time if required without damage to the foam.

Figure 2:
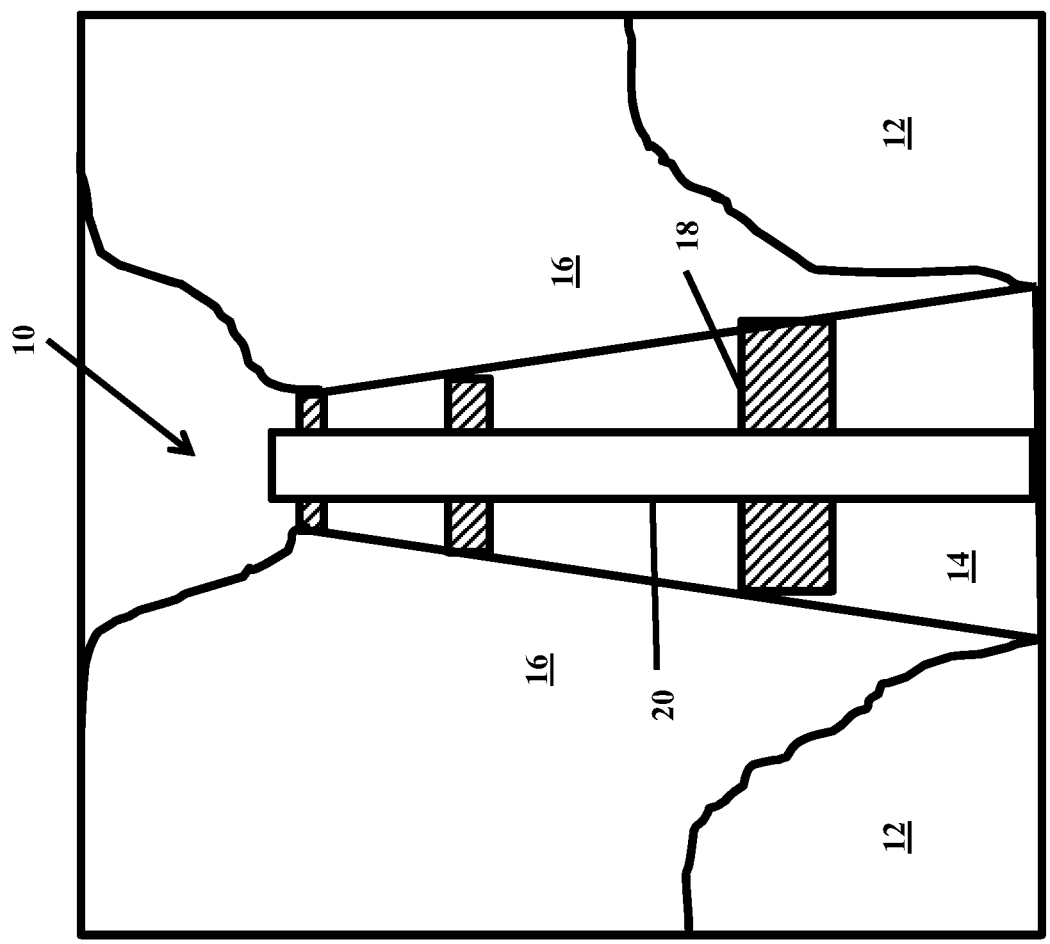
FIG. 2 is a schematic as shown in FIG. 1 showing the pipeline in place.

FIG. 1 shows a schematic of a trench 10 dug in the ground 12 having a bottom 14 and sides 16. A plurality of pillows 18 have been formed in the bottom 14 of the trench 10 in a spaced apart configuration. In the figure the pillows 18 span the width of the bottom 14; however as discussed herein this need not be the case so long as they are sufficiently wide enough to support the pipeline. FIG. 2 shows a pipeline 20 in place in the trench 10 of FIG. 1. The pipeline 20 is supported on the pillows 18.

Figure 3:
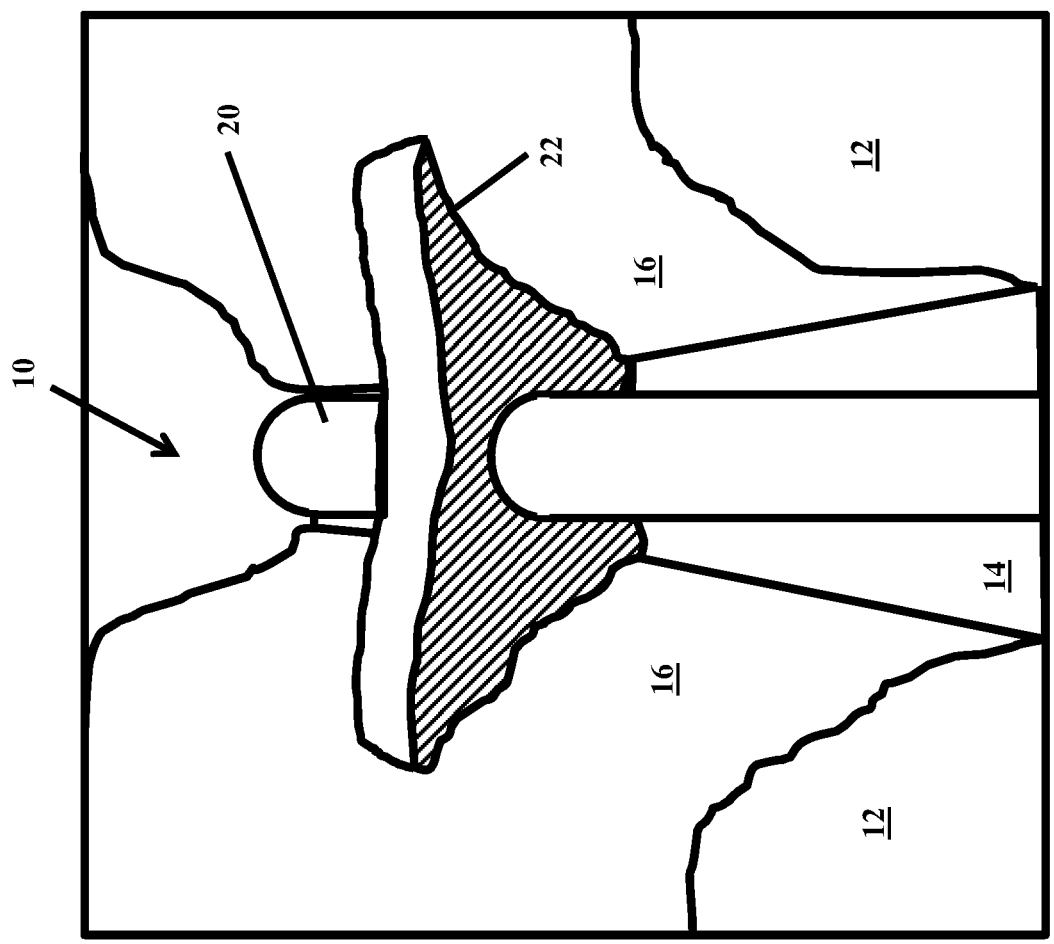
FIG. 3 is a schematic showing a trench breaker according to the present invention in place in a trench and supporting a pipeline.
Figure 4:
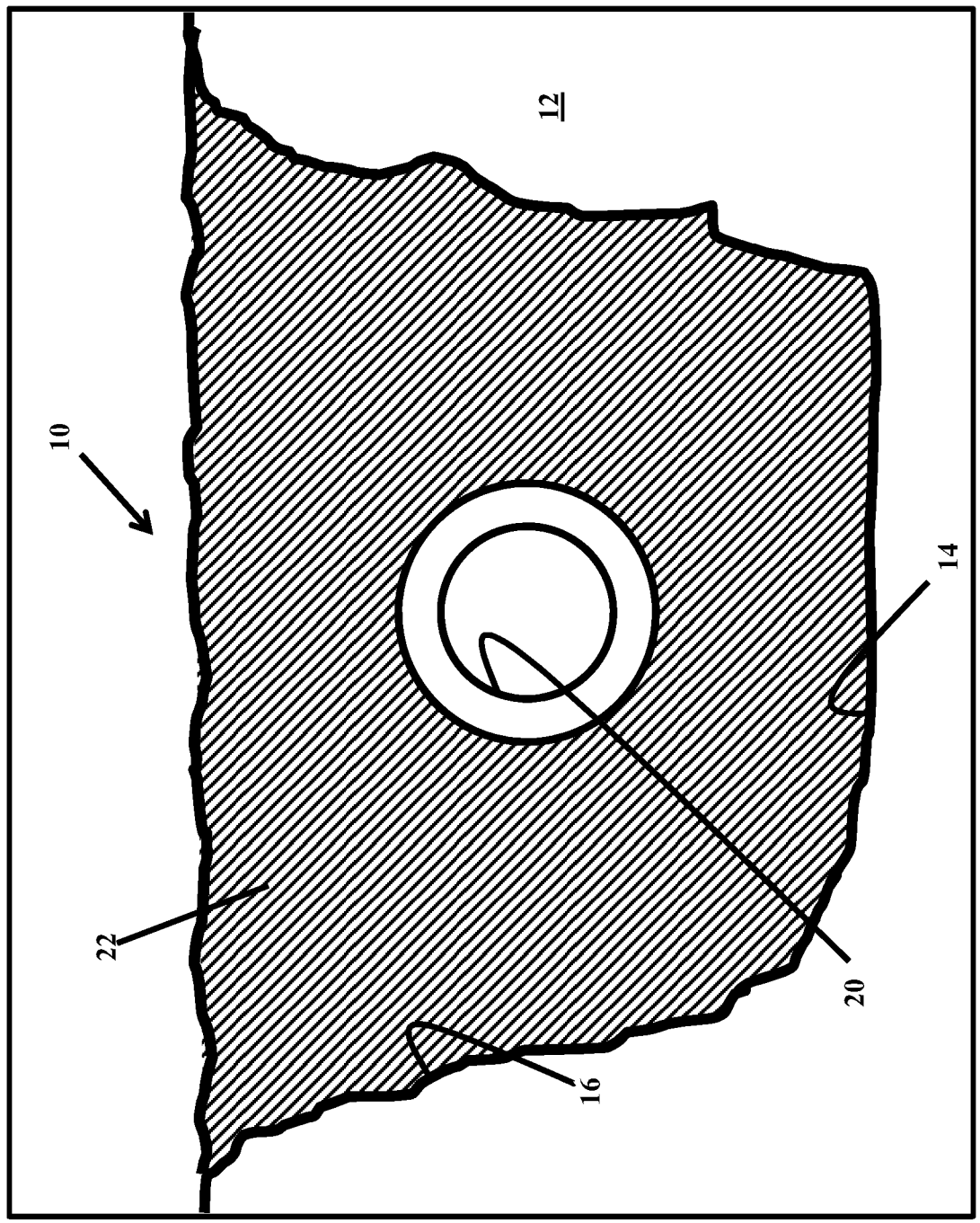
FIG. 4 is a cross-sectional view of the trench breaker of FIG. 3.

FIG. 3 is a schematic showing the pipeline 20 passing through a trench breaker 22 that has been formed in the trench 10. The trench breaker 22 spans the width and depth of the trench 10 and can be any desired thickness. Generally the trench breakers 22 are from 48 to 61 cm thick; however they can be thicker or thinner as required by the number and size of the pipeline(s) 20. FIG. 14 is a cross-sectional view through the trench breaker 22 shown in FIG. 3. Although only a single pipeline 20 is shown in FIGS. 2, 3 and 4 for simplicity sake, the trench can be designed to accommodate a plurality of pipelines and the pillows 18 and trench breakers 22 can be used to support multiple pipelines 20 as desired.

Figure 5:
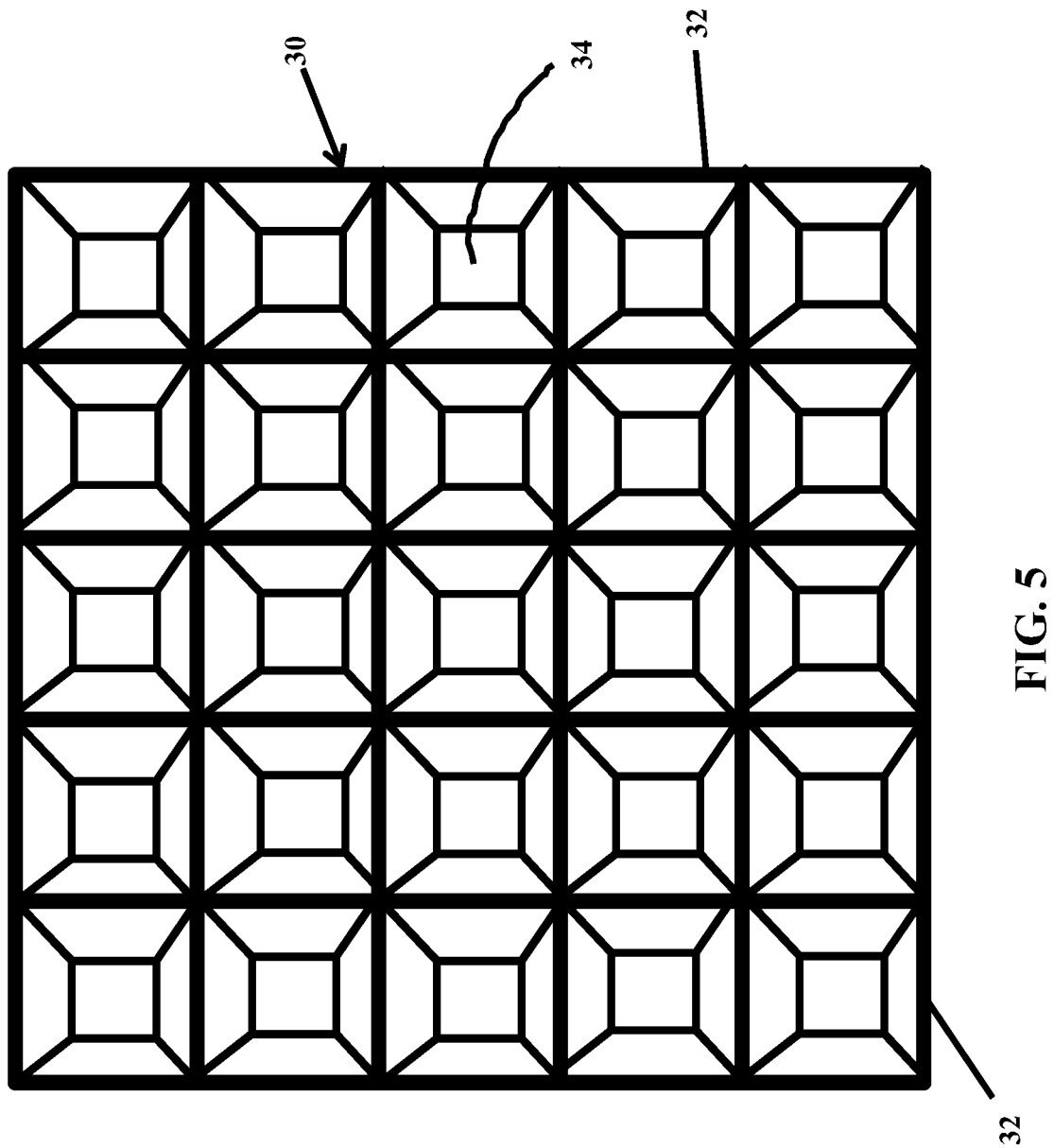
FIG. 5 is a top view of a support pad that can be used between the trench bottom and a pillow or trench breaker according to the present disclosure.
Figure 6:
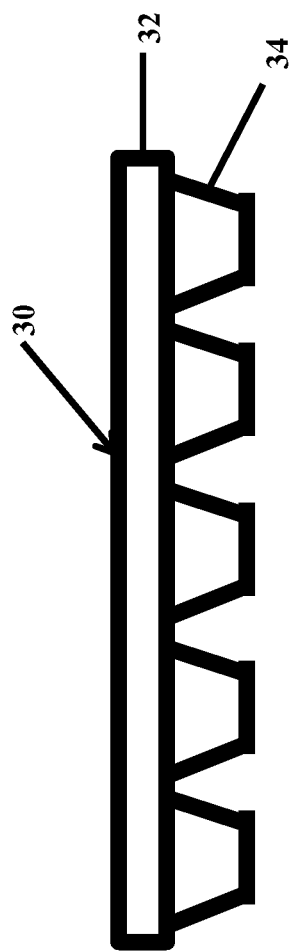
FIG. 6 is a side view of the support pad of FIG. 5.
Figure 7:
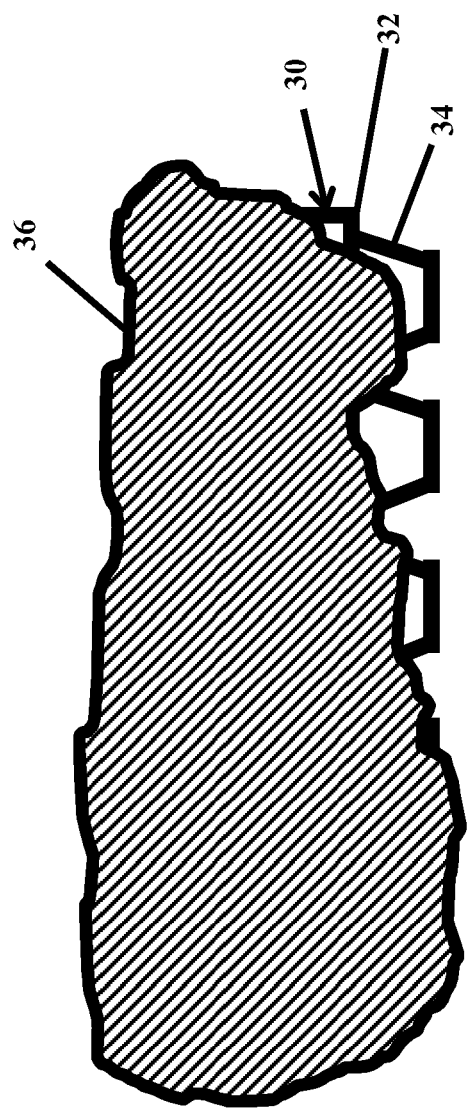
FIG. 7 shows the support pad of FIG. 6 with a foamed pillow in place according to the present disclosure.
Figure 8:
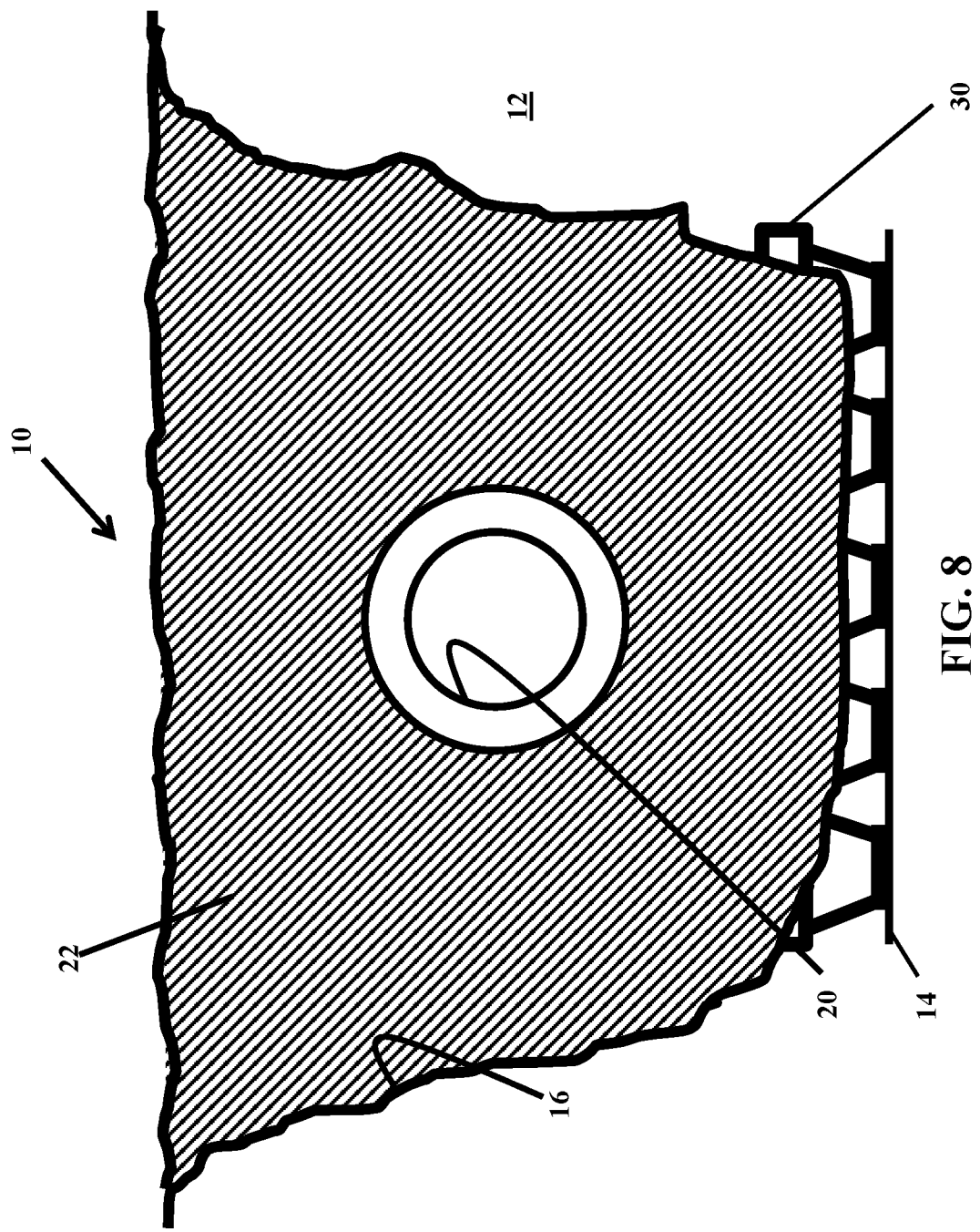
FIG. 8 shows the support pad of FIG. 6 with a trench breaker in place according to the present disclosure.

As discussed herein, especially when the outside temperatures are 15° C. or less or if the ground 12 is very cold or frozen it can be advantageous to utilize a support between the bottom of a pillow 18 or trench breaker 22 and the bottom 14 of the trench 10. This can also be useful, irrespective of the temperature if the bottom 14 of the trench 10 is sloped. FIG. 5 is a schematic top view and FIG. 6 is a side view of one example of a support 30 that can be utilized according to the present disclosure. The support 30 comprises a tray shaped support 30 having a plurality of raised sides 32. In the example show it has four sides, however it can be any desired shape including 6 or 8 sided. The support 30 is preferably formed from a molded pulp fiberboard, cardboard or paperboard material and preferably it is biodegradable. Preferably, the support 30 is electrically conductive, especially when wet as is fiberboard. In the example shown support 30 has a plurality of cup shaped recesses 34 to hold the foam material as it is curing and foaming. The support 30 serves to insulate the foam from the bottom 14 of the trench 10 while the foam is curing and foaming. As shown in FIG. 7 a pillow 36 can be formed on top of the support 30. As shown the foam pillow 36 can and preferably does flow over the sides of the support 30 to eventually contact the bottom 14 of the trench 10. The support 30 is not designed to constrain the foam as it foams, rather it serves to locate the foam and allow it to begin expanding in the desired location insulated from the bottom 14 of the trench 10 initially. Likewise, as shown in FIG. 8, the support 30 can be used between a trench breaker 22 and the bottom 14 of the trench 10. In one example the support 30 can comprise egg tray material that can be purchased in bulk and used during formation of pillows 18 or trench breakers 22. In use the support 30 material is placed in position in the trench 10 and then the foam material according to the present disclosure is applied onto the support 30 material.

The present disclosure presents a solution that addresses many of the shortfalls of the use of polyurethane foams in pipeline formation and provides unique benefits not available with polyurethane foams. These include rapid foaming of a strong material that has a low temperature exothermic reaction of 105° C. or less, rapid cure times of 20 minutes or less. The material has an open cell content of at least 50% and more preferably at least 90% or greater and is sufficiently permeable to water to allow for some flow of water through the material while preventing erosion. The material is very cost effective and is non-flammable, unlike polyurethane foams. The material can be used in a wide range of temperatures and is not damaged by exposure to the elements. The foam material is electrically conductive and does not interfere with the cathodic protection found on pipelines. In one embodiment the present disclosure further includes use of a support between the bottom of a trench and the foam material to enhance the temperature range that the foam can be used in and to aid in use in trenches having a steep slope.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

We claim:

1. A method for supporting a pipe in a trench comprising the steps of:
   a) providing, separately, a component A and a component B, wherein component A comprises at least 23% by weight of alkali silicate and a catalyst and component B comprises at least 75% by weight of at least one polyisocyanate and a block copolymer according to general formula I, based on the total weight of component A and component B, respectively, wherein formula I comprises

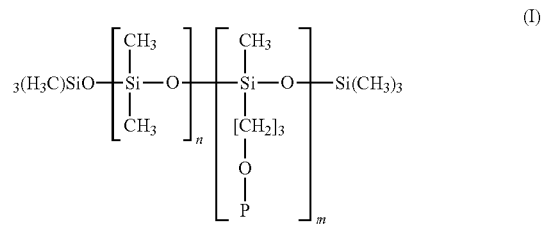

wherein P comprises a polyether having a structure of —$((CH_2)_2O)_x(CH_2)_3O)_y$—R
wherein n, m, x and y are integers and R is either a H or an alkyl group;
   b) combining component A with component B thereby forming a urea-silicate foam material;
   c) placing a support material in the bottom of the trench, the support material being electrically conductive when wet and the support material being biodegradable;
   d) depositing the urea-silicate foam material into the trench onto the support material and allowing it to foam and cure thereby forming a urea-silicate foam pillow on the support material, wherein said urea-silicate foam pillow has an open cell content of at least 50%, is electrically conductive and permeable to water; and e) placing a pipe in the trench with a portion of the pipe in contact with the foam pillow.

2. The method as recited in claim 1 wherein step a) further comprises providing component A and component B, each at a temperature of from 21 to 33° C.

3. The method as recited in claim 1 wherein step a) further comprises providing in component A at least one of water, a polymeric phosphate foam stabilizer, an emulsifier or a mixture thereof and providing in component B at least one of a flame retardant, a foam stabilizer, a viscosity reducer, a catalyst, a finely divided nucleating agent, or a mixture thereof.

4. The method as recited in claim 1 wherein step a) comprises providing as the polyisocyanate in component B, polymeric methylene diphenyl diisocyanate.

5. The method as recited in claim 1 wherein step b) comprises combining component A with component B in a ratio from 1:1+/−10% on a volume basis.

6. The method as recited in claim 1 wherein the support material is formed from a molded pulp material, fiberboard, cardboard or a paperboard material.

7. A method for supporting a pipe in a trench comprising the steps of:

a) providing, separately, a component A and a component B, wherein component A comprises at least 23% by weight of alkali silicate and a catalyst and component B comprises at least 75% by weight of at least one polyisocyanate and a block copolymer according to general formula I, based on the total weight of component A and component B, respectively, wherein formula I comprises

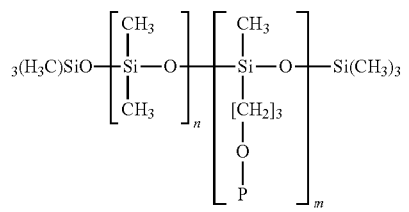

wherein P comprises a polyether having a structure of
—$((CH_2)_2O)_x(CH_2)_3O)_y$—R
wherein n, m, x and y are integers and R is either a H or an alkyl group;

b) combining component A with component B thereby forming a urea-silicate foam material;

c) placing a support material in the bottom of the trench, the support material being electrically conductive when wet and the support material being biodegradable;

d) placing a pipe into the trench; and e) depositing the urea-silicate foam material into the trench onto the support material and over a portion of the pipe and allowing it to foam and cure on the support material and around a portion of the pipe thereby forming a urea-silicate foam trench breaker in the trench, wherein said urea-silicate foam trench breaker has an open cell content of at least 50%, is electrically conductive and permeable to water.

8. The method as recited in claim 7 wherein step a) further comprises providing component A and component B, each at a temperature of from 21 to 33° C.

9. The method as recited in claim 7 wherein step a) further comprises providing in component A at least one of water, a polymeric phosphate foam stabilizer, an emulsifier or a mixture thereof and providing in component B at least one of a flame retardant, a foam stabilizer, a viscosity reducer, a catalyst, a finely divided nucleating agent, or a mixture thereof.

10. The method as recited in claim 7 wherein step a) comprises providing as the polyisocyanate in component B, polymeric methylene diphenyl diisocyanate.

11. The method as recited in claim 7 wherein step b) comprises combining component A with component B in a ratio from 1:1+/−10% on a volume basis.

12. The method as recited in claim 7 wherein the support material is formed from a molded pulp material, fiberboard, cardboard or a paperboard material.

* * * * *